United States Patent
Zarubica et al.

(10) Patent No.: US 10,165,537 B1
(45) Date of Patent: Dec. 25, 2018

(54) DISTRIBUTED NETWORK TIME SYNCHRONIZATION USING GEO-BEACONS

(71) Applicant: L3 Technologies, Inc., New York, NY (US)

(72) Inventors: Radivoje Zarubica, Sandy, UT (US); Samuel C. Kingston, Salt Lake City, UT (US); Osama S. Haddadin, Salt Lake City, UT (US); Marc Padilla, Farmington, UT (US); Matthew A. Lake, Salt Lake City, UT (US)

(73) Assignee: L3 Technologies, Inc., New York, NY (US)

( * ) Notice: Subject to any disclaimer, the term of this patent is extended or adjusted under 35 U.S.C. 154(b) by 162 days.

(21) Appl. No.: 15/442,253

(22) Filed: Feb. 24, 2017

(51) Int. Cl.
    *H04W 56/00* (2009.01)
(52) U.S. Cl.
    CPC ..... *H04W 56/004* (2013.01); *H04W 56/0015* (2013.01)
(58) Field of Classification Search
    None
    See application file for complete search history.

(56) References Cited

U.S. PATENT DOCUMENTS

| | | | |
|---|---|---|---|
| 2015/0215887 A1* | 7/2015 | Nejatian | H04W 56/0045 370/350 |
| 2015/0312078 A1* | 10/2015 | Bogdan | H04L 7/0087 375/226 |
| 2017/0013582 A1* | 1/2017 | Takekawa | H04W 56/0045 |
| 2018/0139002 A1* | 5/2018 | Blasco Serrano | H04W 56/002 |

* cited by examiner

*Primary Examiner* — Shukri Taha
(74) *Attorney, Agent, or Firm* — Workman Nydegger

(57) ABSTRACT

Embodiments are directed to synchronizing time among nodes in a network. In one scenario, a first node receives a timing message which provides an indication of the current time as measured by a second node at transmission of the timing message. The first node determines the timing message propagation time between the first and second nodes using a determined transmission frequency of the timing messages, an internal clock reading of a clock that indicates the current time in the first node, and timing and frequency measurements obtained at the first and second nodes. The first node also applies a weighting factor to the current time of the first node to adjust the current time forward or backward, and combines the determined propagation time with the adjusted clock time of the first node to generate a new, synchronized time and transmission frequency, which is broadcasted to other nodes in the network.

21 Claims, 6 Drawing Sheets

US 10,165,537 B1

DISTRIBUTED NETWORK TIME SYNCHRONIZATION USING GEO-BEACONS

BACKGROUND

Many applications, systems and networks implement some form of timing synchronization. In general, time synchronization a way of arriving at a common time among a plurality of nodes. Various solutions have been proposed for synchronizing time among nodes in a system. For example, timing protocols that have been used in wireless networks include Reference Broadcast Synchronization (RBS), Timing-sync Protocol for Sensor Networks (TPSN), and Flooding Time Synchronization Protocol (FTSP).

None of these three protocols, however, can be used for timing synchronization applications in highly mobile mesh networks. RBS, for example, does not provide sufficient accuracy because it neglects the propagation time between nodes in the system. TPSN is not suited for dynamic networks because its protocols rely on having a known network topology. FTSP does not provide a unique master time to nodes in the network. Moreover, any protocol that uses a master node with a subgroup of slave nodes loses synchronization among the nodes if the master goes down or isn't reachable. In addition to being ill-suited for dynamic mesh networks, the above time synchronization methods cannot provide sub-nanosecond accuracy among the nodes. Thus, current time synchronization methods are lacking for many reasons.

BRIEF SUMMARY

Embodiments described herein are directed to synchronizing time among nodes in a network. In one embodiment, a first node receives a timing message from a second node in the network. The timing message provides an indication of the current time as measured by the second node at transmission of the timing message. The first node then determines the timing message propagation time between the first node and the second node using a determined transmission frequency of the timing messages, an internal clock reading of a clock that indicates the current time in the first node, and timing and frequency measurements obtained at the first and second nodes. The first node also applies a weighting factor to the current time of the first node to adjust the current time of the first node forward or backward and combines the determined propagation time with the adjusted clock time of the first node to generate a new, synchronized time and transmission frequency, which is broadcasted in a subsequent timing message to other nodes in the network.

In another embodiment, a device is provided for synchronizing time among nodes in a network. The device includes a transceiver configured to receive a timing message from a second node in the network and transmit timing messages to other nodes in the network. The timing message provide an indication of the current time and frequency as measured by a first node at transmission of the timing message. The device further includes a local oscillator that governs timing of an internal clock and a processor configured to determine a propagation time between a first node and the second node using a determined transmission frequency of the timing messages, a clock reading of the internal clock that indicates the current time in the first node, and timing and frequency measurements obtained at both the first and the second node.

The device further includes a weighting module configured to apply a weighting factor to the current time of the first node to adjust the current time of the first node forward or backward, as well as a time synchronization module configured to combine the determined propagation time with the adjusted clock time of the first node to generate a new, synchronized time and transmission frequency, which is broadcasted, using the transceiver, in a subsequent timing message to other nodes in the network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
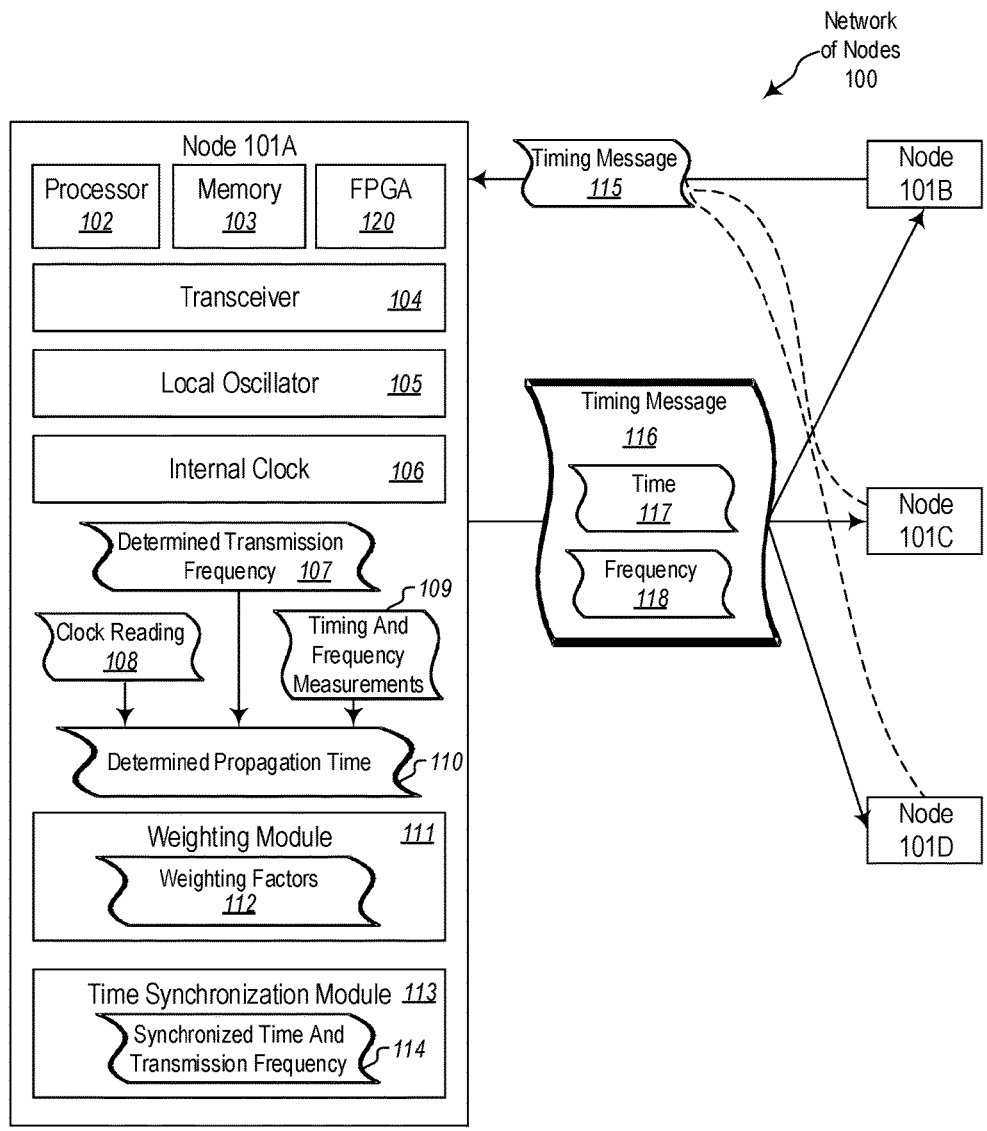
FIG. 1 illustrates a computer architecture in which embodiments described herein may operate including synchronizing time among nodes in a network.

As noted above, the embodiments described herein are directed to synchronizing time among nodes in a network. In one example, a first node receives a timing message from a second node in the network. The timing message provides an indication of the current time as measured by the second node at transmission of the timing message. The first node then determines the timing message propagation time between the first node and the second node using a determined transmission frequency of the timing messages, an internal clock reading of a clock that indicates the current time in the first node, and timing and frequency measurements obtained at the first and second nodes. The first node also applies a weighting factor to the current time of the first node to adjust the current time of the first node forward or backward and combines the determined propagation time with the adjusted clock time of the first node to generate a new, synchronized time and transmission frequency, which is broadcasted in a subsequent timing message to other nodes in the network.

In another example, a device is provided for synchronizing time among nodes in a network. The device includes a transceiver configured to receive a timing message from a second node in the network and transmit timing messages to other nodes in the network. The timing message provide an indication of the current time and frequency as measured by a first node at transmission of the timing message. The device further includes a local oscillator that governs timing of an internal clock and a processor configured to determine a propagation time between a first node and the second node using a determined transmission frequency of the timing messages, a clock reading of the internal clock that indicates the current time in the first node, and timing and frequency measurements obtained at both the first and the second node.

The device further includes a weighting module configured to apply a weighting factor to the current time of the first node to adjust the current time of the first node forward or backward, as well as a time synchronization module configured to combine the determined propagation time with the adjusted clock time of the first node to generate a new, synchronized time and transmission frequency, which is broadcasted, using the transceiver, in a subsequent timing message to other nodes in the network.

Embodiments described herein may implement various types of computing systems. These computing systems are now increasingly taking a wide variety of forms. Computing systems may, for example, be mobile phones, electronic appliances, laptop computers, tablet computers, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems (e.g. a cloud computing environment). In a cloud computing environment, program modules may be located in both local and remote memory storage devices.

As described herein, a computing system may also contain communication channels that allow the computing system to communicate with other message processors over a wired or wireless network. Such communication channels may include hardware-based receivers, transmitters or transceivers, which are configured to receive data, transmit data or perform both. Embodiments described herein also include physical computer-readable media for carrying or storing computer-executable instructions and/or data structures. Such computer-readable media can be any available physical media that can be accessed by a general-purpose or special-purpose computing system.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Referring now to the figures, FIG. 1 illustrates a network architecture 100 in which at least one embodiment described herein may be employed. The network architecture 100 includes a plurality of network nodes (e.g. 101A-101D). While four nodes are shown in the network architecture 100, it will be understood that substantially any number of nodes may be included. The nodes may be computer systems, or may be devices or other systems, vehicles or apparatuses that include processing power. For example, the node 101A includes at least one processor 102 and at least some system memory 103.

The node 101A may be any type of local or distributed node, and may be mobile or stationary. In some embodiments, each of the nodes 101A-101D are (or are a part of) mobile vehicles including automobiles, aircraft, ships, drones (i.e. unmanned aerial vehicles), or other devices capable of motion. Each node includes modules for performing different functions. For instance, node 101A includes transceiver 104, which may be configured to communicate with other nodes or computer systems. The transceiver 104 may include any wired or wireless communication means that can receive and/or transmit data to or from other nodes or computer systems. The transceiver 104 may be configured to interact with databases, mobile computing devices (such as mobile phones or tablets), embedded devices or other types of computer systems.

In cases where the nodes 101A-101D are mobile, it may be desirable to perform geolocation and time synchronization of those nodes in the network. As the term is used herein, "geolocation" includes an indication of a node's three-dimensional position, velocity and current time. Time synchronization may be performed to increase the accuracy of geolocation determinations. Each node measures range and relative velocity to other nodes as well as synchronizing time with other nodes. Each node can estimate range and relative velocity to other nodes using local timing and frequency measurements, along with remote timing and frequency measurements obtained through a physical layer message exchange between nodes in the network 100. The geolocation algorithms described herein are designed to support mobile ad-hoc airborne networks where range and relative velocity change rapidly, and where estimated ranges and relative velocities are to be properly time tagged. The time tagging of measurements is performed according to the consensus time available on each node.

As shown in FIG. 1, the geolocation algorithms may be performed by the nodes 101A-101D using hardware and/or software provided on the nodes. Node 101A, for example, includes a transceiver 104 which is configured to receive timing messages (e.g. 115) from other nodes in the network 100. The transceiver 102 is also configured to transmit timing messages (e.g. 116) to other nodes in the network (e.g. 101B, 101C or 101D). The timing message sent from node 101A provides an indication of the current time 117 and frequency 118 as measured by node 101A at transmission of the timing message 116. A local oscillator 105 is also included in node 101A that governs timing of an internal clock 106.

As part of the geolocation and time synchronization algorithm, the processor 102 in node 101A may be configured to determine a propagation time 110 between itself and one or more of the other network nodes including node 101B. The propagation time 110 is determined using a determined transmission frequency 107 of the timing messages, a clock reading 108 of the internal clock 106 that indicates the current time in node 101A, and timing and frequency measurements 109 obtained at both nodes 101A and 101B. Using this determined propagation time 110, a weighting module 111 of node 101A may be configured to apply weighting factor 112 to the current time of node 101A to adjust the current time of the node 101A forward or backward. A time synchronization module 113 may then combine the determined propagation time 110 with the adjusted clock time of node 101A to generate a new, synchronized time and transmission frequency 114, which is broadcasted, using the transceiver 104, in timing message 116 to other nodes in the network 100. These concepts will be explained further below with regard to FIGS. 2-6, and then with further regard to methods 700 and 800 of FIGS. 7 and 8, respectively.

Figure 2:
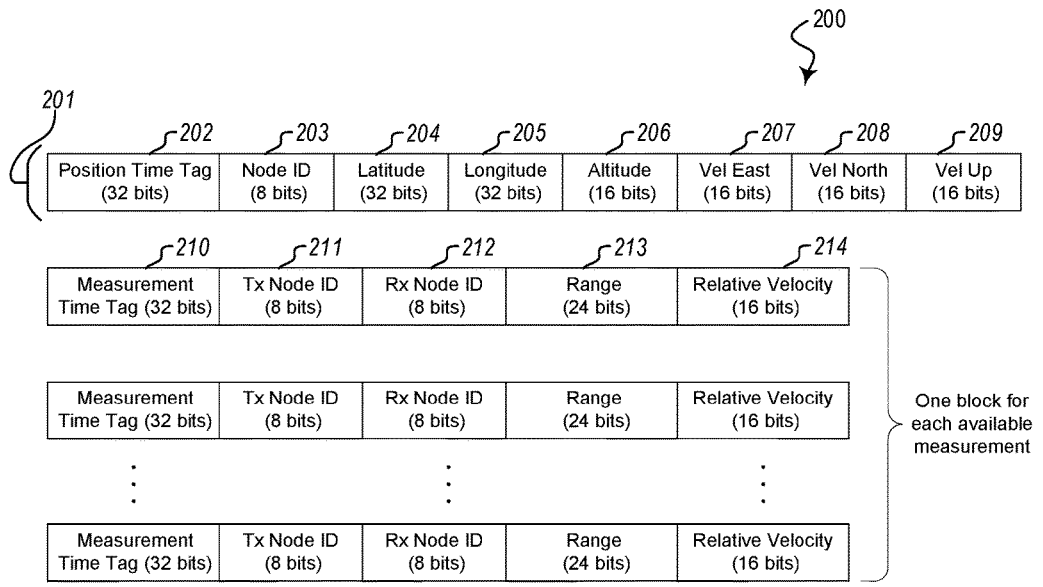
FIG. 2 illustrates an embodiment of the example contents of a position range velocity message.

FIG. 2 illustrates one embodiment of a position range velocity (PRV) message 200. Each node in the network 100 creates PRV messages. These PRV messages may be similar to or the same as the timing messages 115 and 116 shown in FIG. 1. The PRV messages may be created and transmitted on a periodic basis (e.g. every second or every 0.5 seconds). In some embodiments, the PRV message components (i.e. the various message fields 201) are calculated in a dedicated hardware component (such as a field programmable gate array (FPGA) 120) and then sent to the processor 102 for framing and then on to the transceiver 104 for transmission to the other nodes.

Each node in the network 100 may also be responsible for receiving and forwarding PRV messages received from other nodes. The PRV messages are not just point to point messages and, as such, the messages or the information contained in them need to be propagated through the network. Nodes can use their own forwarding mechanisms to ensure proper propagation of PRV messages through the network 100. In some cases, the network nodes are configured to forward each received PRV message only once using a Time-To-Live (TTL) field, while in other cases, received PRV messages may be forwarded more than once.

Each PRV message may include a variety of fields, as shown in the example PRV message structure of FIG. 2. It should be noted that the PRV message in FIG. 2 represents only the application layer part of the entire message. The full PRV message has additional fields used by layers 2-6 (generic framing procedure (GFP), user datagram protocol (UDP), internet protocol (IP), etc.). The fields used in the PRV message of FIG. 2 are as follows: a position time tag field 202 is used to mark the time at which the position and velocity fields are valid. This field is derived from the consensus time (available on a modem or other communication means) and GPS time associated with the position and velocity (received from the GPS receiver connected to the modem). If the GPS receiver is not connected to the modem (or it is denied), the position time tag (along with position fields) is left blank.

The node ID field 203 represents a unique identification number for each node in the network. Latitude 204, longitude 205, altitude 206 and velocity East 207, velocity North 208, and velocity up 209 are fields received from a GPS receiver or altimeter. If a GPS receiver is not available, only the altitude field 206 will be used. A measurement time tag field 210 represents the consensus time at which the corresponding range and relative velocity measurements are valid. The Tx Node ID field 211 and the Rx Node ID field 212 represent unique identification numbers for the transmit and receive nodes involved in the measurement. The receiving node performs measurements on the waveform transmitted by the transmitting node.

The range field 213 represents the last estimated range between the transmitting and receiving nodes normalized by the nominal speed of light. The range is equal to the propagation time between the nodes $r_{norm}=r/C=t_P$. The relative velocity field 214 represents the last estimated relative velocity between transmitting and receiving nodes normalized by the nominal speed of light. The relative velocity is calculated as $v_{norm}=v/C=(1-\sqrt{R_{ni}R_{in}})$. If a node does not have GPS receiver or is in a GPS-denied area, position fields (Latitude, Longitude, Altitude), velocity fields (Vel East, Vel North, Vel Up) and position time tag fields are typically zeroed out, unless the node has an altimeter, in which case position time tag, node ID and altitude fields are populated using the altimeter information.

Figure 3:
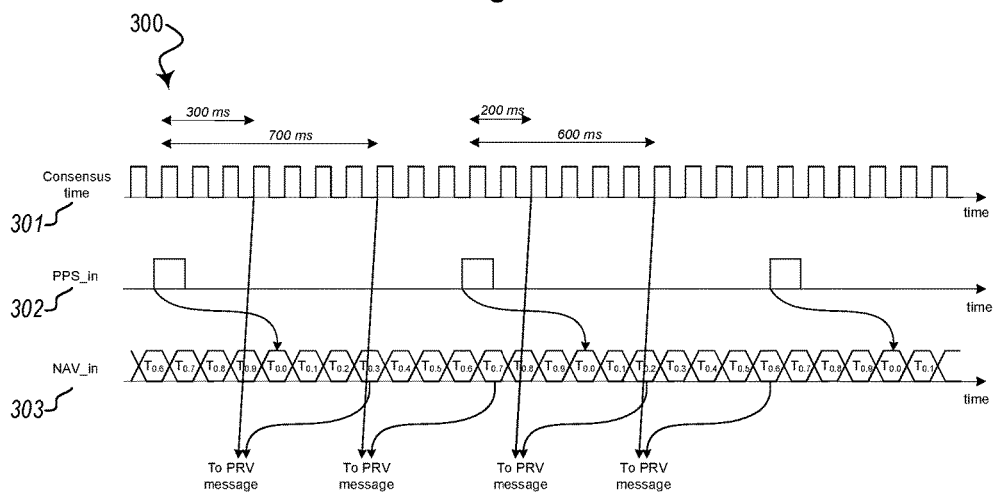
FIG. 3 illustrates an embodiment of a consensus and time GPS data chart.

FIG. 3 illustrates a timing chart 300 outlining the process of populating the first eight fields in the PRV message. In order to accurately time tag position and velocity information received from a GPS receiver, the dedicated hardware (e.g. FPGA) or processor 102 needs to synchronize GPS receiver time with the consensus time 301 available inside the dedicated hardware.

The GPS receiver (often assisted by an Inertial Navigation System (INS)) provides position, velocity and GPS time information via the data bus "NAV_in" 303. The data bus may go through various parts of the system before reaching the FPGA 120, and may experience unpredictable latency. The pulse per second (PPS) signal 302 from the GPS receiver arrives to the FPGA via a discrete line connected directly to the FPGA. The PPS signal goes high at the start of each second in UTC time. Every time the PPS signal goes high the FPGA calculates the consensus time.

In the example in FIG. 3, the FPGA 120 of FIG. 1 determines that it is time to create a new PRV message (e.g. because a message creation timer goes off), and accesses the data $T_{0.3}$ from the NAV_in bus 303. In this example, it is assumed that the GPS data comes in 10 times per second and the subscript 0.3 means that the GPS time tag associated with that data has a YYYY/MM/DD/HH/MM/SS/3 format. Consequently, the data is 300 ms delayed from the PPS signal received in the FPGA. Since the FPGA knows the consensus time at the time the PPS signal goes high, it then adds 300 ms to that value and that becomes the position time tag associated with the data $T_{0.3}$. In cases where only an altimeter is available, the time tagging is performed in a different manner. Since many altimeters don't have a PPS signal, the time tag associated with the altitude reading is the value of the consensus time when the altitude reading is obtained.

Normalized range and relative velocity sent in the PRV messages are un-normalized in the geolocation algorithm. The un-normalization of the range and relative velocity is performed by multiplying the normalized range and relative velocity (received in the PRV messages) with the estimate of the speed of light along the path between the two nodes. The geolocation algorithm has an estimate of the node location and can apply more sophisticated refraction models to accurately estimate the speed of light along the path between the two nodes.

Each node that participates in the geolocation network (e.g. network 100) is capable of estimating its own position and velocity along with the position and velocity of other nodes in the network given sufficient network connectivity and a sufficient number of nodes with known position. The processor 102 calculates the estimated position and velocity, and the FPGA 120 reports those estimates to the platform via the NAV bus 303. Modems or transceivers in the network may be configured to provide their own position and velocity data to the network, and can be used instead of (or in addition to) the GPS receivers onboard the platforms carrying the modems. For this reason, each modem may implement an interface to the network that is similar to a GPS receiver interface.

Figure 4:
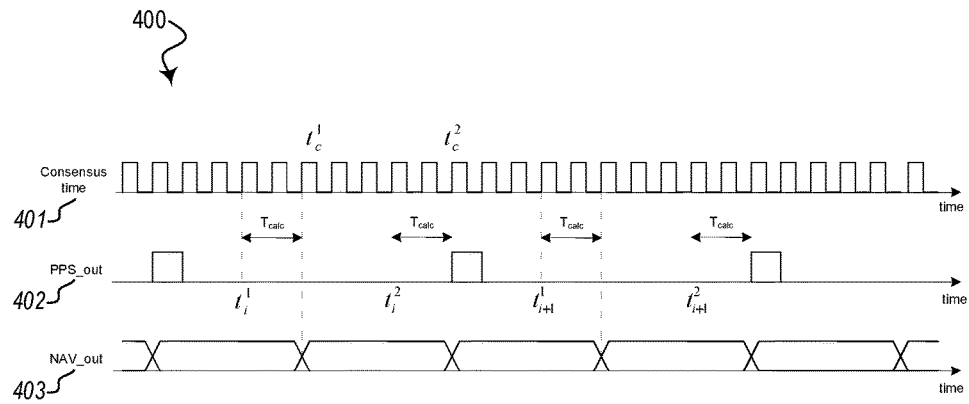
FIG. 4 illustrates an embodiment of a timing chart in which estimated position and velocity are reported.

A node reporting diagram 400 is shown in FIG. 4. The FPGA 120 or other dedicated hardware component is responsible for creating the PPS_out signal 402 that goes high at specified intervals (e.g. once per second or every time the consensus time 401 crosses the second boundary). At the same time (and synchronous with the PPS_out signal 402), the estimated position and velocity of the node are output on the NAV_out bus 403. In order to have the appropriate information ready for output at the designated times, the FPGA 120 creates a request to the processor 102 for position and velocity estimation $T_{calc}$ seconds prior to that estimate being reported on the NAV_out bus 403. In the request to the processor, the FPGA states the consensus time 401 at which the estimate is needed. FIG. 4 shows a position reporting rate of twice per second. It will be understood, however, that the actual report rate is programmable and may be changed by a user. In at least some embodiments, a rate of 2 Hz is used.

In the embodiment of FIG. 4, the FPGA 120 of FIG. 1 creates two requests to the processor at times $t_i^1$ and $t_i^2$. In those requests, the FPGA states that the consensus times 401 at which the position and velocity are needed are $t_c^1$ and $t_c^2$. Once the processor 102 responds with the estimated position and velocity, the FPGA puts the estimates to the NAV_out bus 403 along with their corresponding consensus times.

Figure 5:
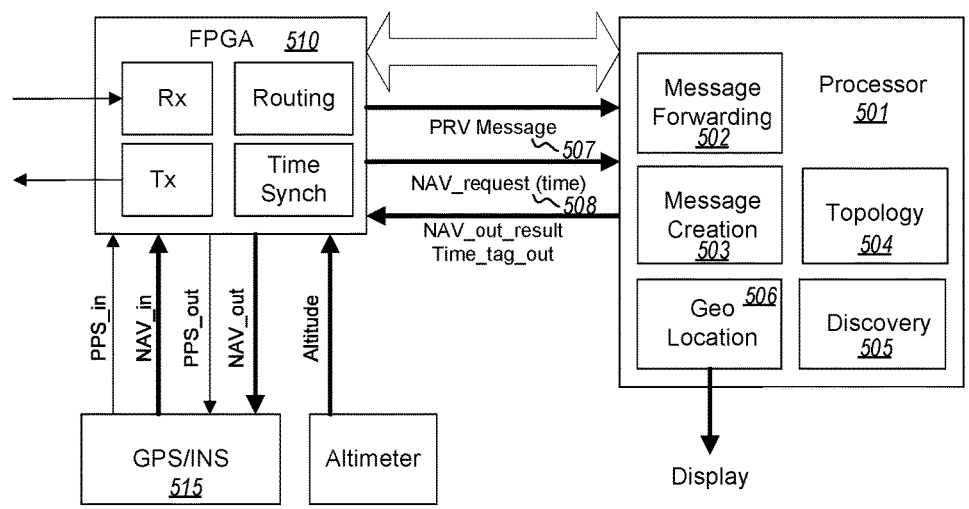
FIG. 5 illustrates an embodiment of example system interfaces and functions.

FIG. 5 illustrates interfaces between components in the system (e.g. in each node) and the functions performed by the system components. The processor 501 performs multiple functions including final PRV message forwarding 502, message creation 503, topology 504, discovery 505, and geolocation 506. Inputs to the geolocation algorithm include the PRV messages 507 created locally and the PRV messages received from other nodes in the network. The PRV messages created locally are created in the message creation block 503 within the processor 501 and given to the geolocation algorithm. The PRV messages received from other nodes in the network are received through the communication link (by the forwarding block 502) and given to the geolocation algorithm as well. The local and remote PRV messages are received asynchronously with each other. The last input to the geolocation algorithm is the request from the FPGA 510 that triggers geolocation algorithm calculation. The request (NAV_request 508) consists of only a consensus time at which the position and velocity estimation are to be performed.

The output of the geolocation algorithm consists of the position and velocity of each node in the network at the time defined by the NAV_request 508. However, only the local node position and velocity is sent back to the FPGA 510 (so that it can be output on the NAV_out bus to the GPS/INS 515). Position and velocity of other nodes in the network may be used for situational awareness and displayed on a screen as well as to assist topology management functions.

The geolocation algorithm is responsible for receiving the local and remote PRV messages as they come in, and extracting the information from them. Each message is accessed and information from the message is stored in a measurement list. Each of the variables used in the geolocation algorithm are known or can be measured. The propagation between two antennas depends on the sum of all delays (not individual transmit and receive delays) which means that for the ranging between the two modems, each modem needs to broadcast sum of its own transmit and received delay.

Figure 6:
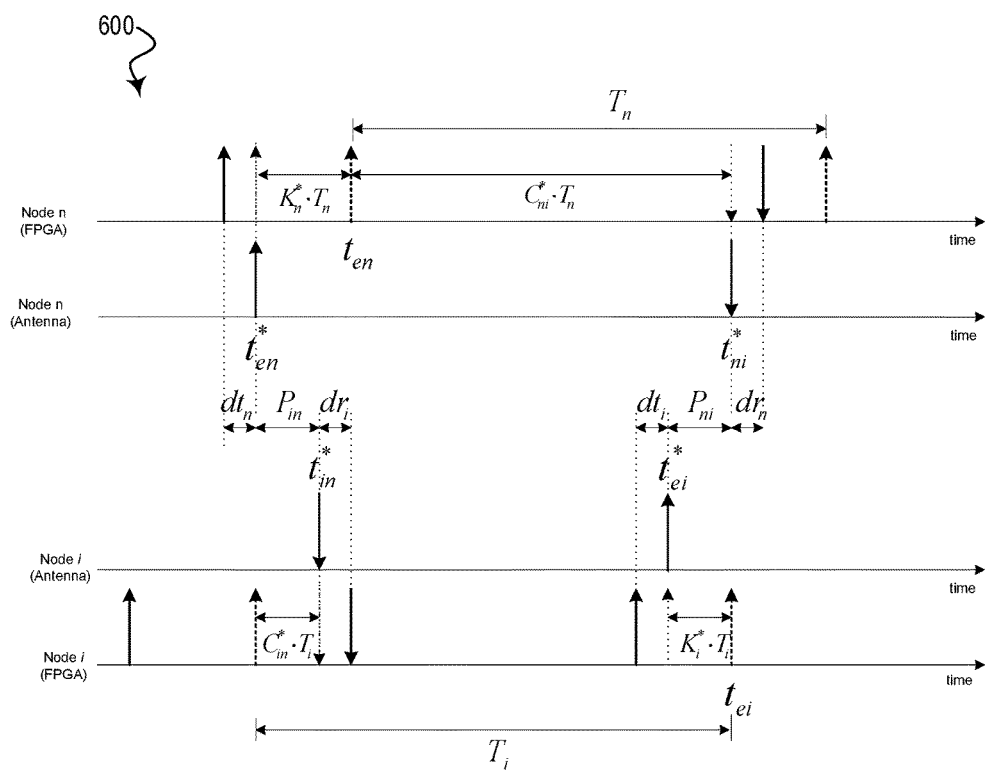
FIG. 6 illustrates an example timing diagram for nodes in a distributed network of nodes.

For example, in timing diagram 600 of FIG. 6, it can be seen that the propagation delay between two modem FPGAs depends on the difference between each modem's transmit and receive delay difference $\Delta_{diff}$ $(dt_n-dr_n)-(dt_i-dr_i)$. In cases where transmit and receive delays are equal, $\Delta_{diff}$ would be equal zero. If transmit and receive delays are not equal but their difference is constant across all the modems $\Delta_{diff}$ would be equal zero. If neither of the two conditions is met, $\Delta_{diff}$ would not be equal zero. In this case, each modem would have to broadcast its transmit and receive delays (separately) to allow accurate time synchronization. Errors in transmit and receive delay measurements may cause bias in the time synchronization process.

Transmit and receive delays through the hardware are independently measured in order to support both ranging and timing synchronization functionality. In some embodiments, the amount of data sent across the link and the amount of hardware (or time) required for calculations may be reduced by reusing some of the fields already allocated to Geo-beacon messages to calculate propagation time required for ranging and timing synchronization. Instead of sending measured values across the communication link, modified values may be sent. These values are modified in such a manner that they correspond to the events happening at the antenna ports instead of the FPGA. In order to relate the measurements obtained in the FPGA to the events at the antenna port, transmit and receive delays are measured and stored on the hardware.

The modification process includes subtracting receiver delay (stored in a register) from the measurement obtained when a message is received in the FPGA and dividing the delay with a nominal message period ($T_N$) to obtain respective input and output values. A similar process may be performed on the transmitter end where transmitter delay is subtracted from early transmission time value and is then divided by the nominal message period. Various mathematical equations may be used to calculate over-the-air propagation delay between two modem antennas. This calculated delay can then be multiplied with the speed of light to obtain the range between the two antennas.

In order to perform time synchronization between two modems, the system first identifies the transmit and receive delay through hardware as well as the propagation time. At least in some cases, the modems do not need to explicitly exchange hardware delays; instead, the modified measurements exchanged for propagation time calculation can be used to time synchronize two FPGAs. The ability to relate time in one modem FPGA to the time in another modem FPGA allows the nodes to synchronize their time. These concepts will be explained further below with regard to methods 700 and 800 of FIGS. 7 and 8, respectively.

Figure 7:
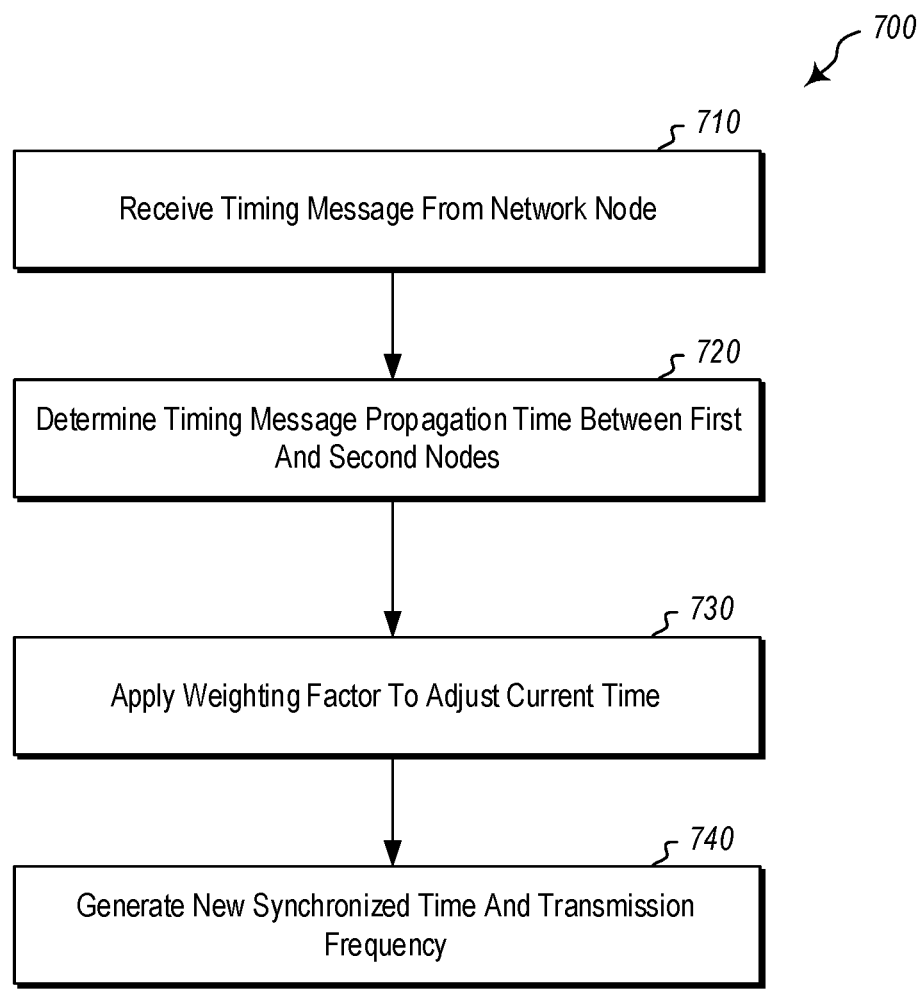
FIG. 7 illustrates a flowchart of an example method for synchronizing time among nodes in a network.
Figure 8:
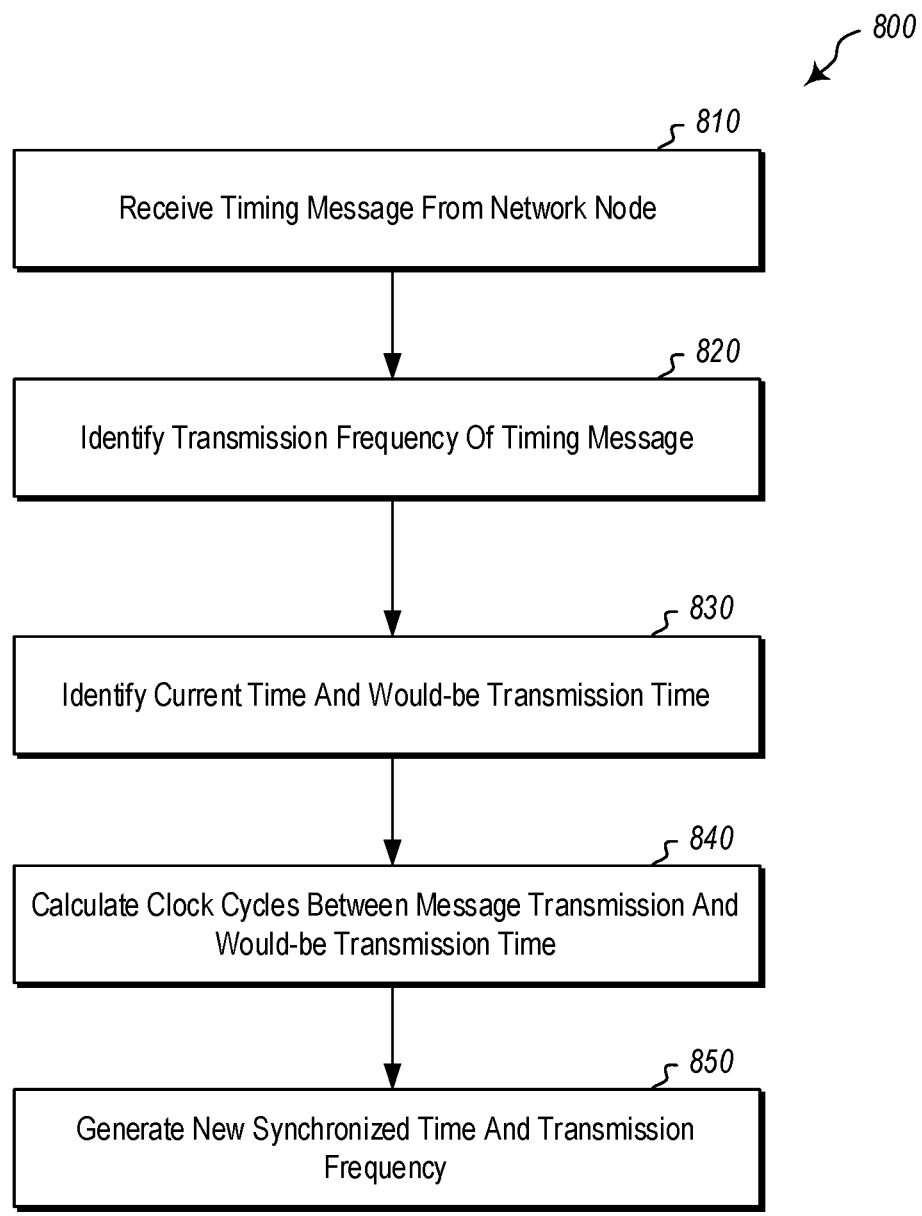
FIG. 8 illustrates a flowchart of an example method for synchronizing time among nodes in a network.

In view of the systems and architectures described above, methodologies that may be implemented in accordance with the disclosed subject matter will be better appreciated with reference to the flow charts of FIGS. 7 and 8. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 7 illustrates a flowchart of a method 700 for synchronizing time among nodes in a network. The method 700 will now be described with frequent reference to the components, nodes and other elements of network architecture 100 of FIG. 1.

Method 700 includes receiving, at a first node, at least one timing message from a second node in the network, the timing message providing an indication of the current time as measured by the second node at transmission of the timing message (710). For example, node 101A may receive timing message 115 from node 101B. Timing messages may also be received from other nodes in the network of nodes 100 including nodes 101C and 101D, but in this embodiment, the timing message is received from node 101B. The timing message 115 provides an indication of the current time as measured by node 101B at the time the timing message is transmitted to node 101A. The timing message may include other information as needed, and may itself be part of another message such as a geo-beacon message.

Method 700 next includes determining the timing message propagation time between the first node and the second node using a determined transmission frequency of the timing messages, an internal clock reading of a clock that indicates the current time in the first node, and timing and frequency measurements obtained at both the first and the second node (720). As noted in the discussion above regarding FIGS. 2-6, various methods and algorithms may be used to determine the propagation time between nodes 101B and 101A. In at least one embodiment, the propagation time associated with the timing message 115 is determined using a determined transmission frequency 107 used when transmitting the timing message. An internal clock reading on node 101A (using internal clock 106) is also used, along with timing and frequency measurements 109 obtained at nodes 101A and 101B.

The timing and frequency measurements 109 may be determined at each node using an FPGA 120 and processor 102. The timing measurements can be made using the internal clock 106 which runs according to local oscillator 105. The frequency measurements can be made at the transceiver 104 or other communication means such as a modem. The determined transmission frequency 107, the clock reading 108 and the timing and frequency measurements 109 are each used as factors when determining the propagation time 109. Thus, in one embodiment, if a signal was transmitted at 10 MHz, and received at 10.05 MHz, node 101A would determine that the nodes' clocks are different and that the distance is different due to the Doppler effect. The FPGA 120 or processor 102 identifies differences in the respective clocks and the differences in distance due to Doppler. By doing this, clock uncertainty is removed from the measurements.

Method 700 next includes applying a weighting factor to the current time of the first node to adjust the current time of the first node forward or backward (730). The weighting module 111 may use various weighting factors 112 to apply a designated weight to a given time measurement. For instance, if a given node (e.g. node 101B) is consistently providing time readings that appear to be too fast or too slow, that node will be given a lower weighting. The lower weighting indicates that the node is not a reliable indicator of time. Conversely, if a node consistently provides time readings that appear to be accurate, that node is given a higher weighting. Thus, over time, each node in the network of nodes 100 may learn the operating tendencies of the other nodes in the network, and may determine which nodes are to be trusted when synchronizing time between the nodes. The weighting factors may further indicate that the node's time is to be adjusted forward or backward. Thus, if enough trusted nodes indicate that node 101A's time is to be adjusted forward, for example, its time will be adjusted accordingly.

Method 700 also includes combining the determined propagation time with the adjusted clock time of the first node to generate a new, synchronized time and transmission frequency, which is broadcasted in a subsequent timing message to one or more other nodes in the network (740). The time synchronization module 113 of node 101A may access the determined propagation time 110 and the adjusted clock time and combine these times to generate a new, synchronized time and transmission frequency 114. This synchronized time and transmission frequency 114 is sent to other nodes in the network of nodes 100 in a subsequent timing message (e.g. timing message 116). The timing message 116 includes an indication of the new, synchronized time 117, as well as an indication of the transmission frequency 118. This message can be sent to any single node, or to a plurality of nodes. The message 116 can be sent on a periodic basis (e.g. every 0.5 seconds), or can be sent on a specified, non-periodic programmed basis.

Within the network of nodes 100, each node may represent or itself be a mobile object such as a car, ship, airplane, drone, missile, or other mobile object. The network of nodes 100 is a distributed network with multiple distributed nodes, where no single master node exists that controls time. In some traditional time synchronization schemes, one master node receives all of the incoming time synchronization requests, and provides replies to each node, thereby synchronizing time among the nodes. However, in this scheme, if the master node goes down or is unreachable, other nodes can easily lose their time synch. As such, these traditional time synchronization systems may be undesirable in many situations. In the embodiments herein, the network nodes are each capable of sending and receiving timing messages and, as such, there is no single point of failure among the nodes. This provides a level of reliability and robustness not found in prior systems.

Each node in the network may be programmed to broadcast timing messages (e.g. 115 and 116). These timing messages may be broadcast continually within the network, with newly generated synchronized time and transmission frequency indications in each message. Thus, in this manner, the nodes may be in a mode of constantly updating their synchronized time and transmission frequencies among the group. As such, a very highly synchronized time may be provided in the network, with very precise times shared by the nodes. These precise synchronization times and frequencies may allow for measurements to be calculated including distance and relative geolocation.

In some cases, the timing messages 115 and 116 are broadcast without waiting for a reply message from the other nodes in the network. For example, a given node may send a timing message and start a clock. The node may then reply with a reply message and initial sender stops their clock, which indicates a round trip time. The messages may be sent continuously and, as such, the sending node does not wait for a reply. When the node does receive a reply, the node replies with a subsequent timing message. The reply timing messages may be sent as standalone messages, or may be part of other inter-node communications. For instance, timing messages may be broadcast as Geo-beacon messages. Thus, each node in the network may broadcast it's conception of time (i.e. the time it thinks is correct) in a series of Geo-beacon messages. Each node then determines the propagation time 110 between sender and receiver, and uses its own (weighted) clock information and the sender's (weighted) clock information to determine the correct time.

Over time, after many timing messages have been received from other nodes, a node such as 101A may determine that a node in the network of nodes 100 is providing unreliable time indications. The weighting module 111 may then be implemented to decrease the weighting factor for the unreliable node. Similarly, if a network node is providing consistently reliable time indications, the weighting module 111 may increase the weighting factor for the reliable node, thereby providing an increased weight to the time values provided by that node. Due to various factors, some nodes that are initially reliable or unreliable may change over time to become reliable or unreliable. Accordingly, the weighting factors may be tuned over time. As such, the weighting factors for each node may be incrementally adjusted over time to increase accuracy of the current time for each node.

Initially, when nodes join the network 100, they may be unaware of the synchronized time within that network. The joining node may be configured to broadcast a message indicating that the joining node is not time-synchronized. Thus, other nodes may be put on notice that the joining node is unreliable with regard to the synchronized time. The joining node may determine propagation times 110 between itself and the other distributed nodes, and may determine a synchronized time and transmission frequency 114, as described in method 700. The incoming node receives timing messages from other nodes in the network and combines those timing messages to interpolate a correct time. The joining node may then broadcast subsequent timing messages declaring that the incoming node is now time-synchronized. Thus, the incoming node listens first to the time indications provided by the other nodes of the network, and then pulls its designation of time to that of the other nodes in the network.

FIG. 8 illustrates a flowchart of a method 800 for synchronizing time among nodes in a network. The method 800 will now be described with frequent reference to the components and data of environment 100 of FIG. 1.

Method 800 includes receiving, at a first node, at least one timing message from a second node in the network, the timing message providing an indication of the current time as measured by the second node at transmission of the timing message, wherein a plurality of timing messages are sent at a regular interval with a specified period (810). For example, node 101A may receive a timing message 115 from node(s) 101B, 101C, and/or 101D. The timing message provides an indication of the current time as measured by that node at the time the timing message is transmitted to node 101A. The timing messages may be broadcast by the network nodes at regular intervals. Timing messages may be broadcast by the nodes regardless of whether they receive timing messages from other nodes in the network.

Method 800 next includes identifying a transmission frequency of the timing message (820) and identifying a current time at the first node, and a time at which the timing message was supposed to have been sent by the second node according to the specified period (830). The FPGA 120 and/or processor 102 of node 101A may identify the frequency at which the timing message was transmitted, and may further identify the current time at node 101A using the internal clock 106 which is controlled by the local oscillator 105. Once the current time and transmission frequency have been identified, the processor and/or FPGA may identify a time at which the timing message was supposed to have been sent by the second node. This may be performed by looking at a clock cycle period, as will be explained further below.

Based on the current time, the node processor calculates the number of clock cycles that occurred between the time the timing message was sent and the time the timing message was supposed to have been sent, relative to the specified period, wherein the number of clock cycles relative to the period indicates a propagation time between the first and second nodes (840). Each node has a local oscillator 105 that oscillates between high and low clock cycles at a given frequency. Based on the current time, and the time at which the timing message was supposed to have been sent, the node processor 102 can calculate the number of clock cycles that have occurred between the time the timing message was sent and the time the timing message was supposed to have been sent, relative to the period of the local oscillator. The number of clock cycles relative to this period indicates the propagation time 110 between nodes 101A and 101B.

After this step, the node processor generates a new, synchronized time and transmission frequency 114, according to determined propagation time and the identified transmission frequency used by the second node, wherein the new, synchronized time and transmission frequency is broadcasted in a subsequent timing message to one or more other nodes in the network (850). Once the new, synchronized time and transmission frequency 114 have been generated according to the determined propagation time 110 and the identified transmission frequency, that new synchronized time and transmission frequency is transmitted in a timing message to other nodes in the network by the transceiver 104. It should be noted that the propagation time between nodes may be distinguished by identifying relative times between the nodes using clock cycles. Thus, the actual time (i.e. the generally accepted, atomic-based worldwide time) is not necessarily needed. Rather, a relative time may be determined between the nodes. That relative time, used by each of the nodes in the network, is used when calculating propagation time, distance and other measurements.

Once calculated, the propagation time may be refined according to an indication of time relative to the period of the clock cycles. For example, if a timing message is to be sent at a specific time, according to a periodic schedule, and is actually sent at a (slightly) later time, the number of clock cycles may be determined between when the timing message was supposed to be sent and when it was actually sent. The identified number of cycles can then be represented relative to the timing message transmission period (e.g. 0.2 of period). The receiving node then indicates that it received the message Y time relative to the period. The relative time between the nodes can then be identified using these values. Using the relative time, a new synchronized time and transmission frequency 114 can then be determined and broadcast to the other nodes.

The timing measurements are thus designed to remove clock differences that are present at each of the nodes. Moreover, the frequency measurements made at the nodes are designed to remove transmission frequency differences between the nodes. Thus, the only unknowns in the time synchronization calculations are the propagation times, which are calculated in the manners described in methods 700 and 800. Timing messages sent out by node 101A may include timing and frequency data for each of the nodes that replied within a specified past period of time. Thus, if nodes 101B, 101C and 101D all reply with timing and frequency data within a specified period (e.g. one second), the timing message 116 sent out by node 101A will include the timing and frequency data of node 101B, node 101C and node 101D. These nodes may then use the timing and frequency data to update their synchronized times, and to weigh the other nodes with regard to liability and accuracy. The period for inclusion of such data may be configurable, so that more or fewer nodes' timing and frequency data is included in node 101A's outgoing timing messages.

Timing messages may also be configured to include an indication of how slow or fast node 101A is relative to an average frequency among the nodes. Thus, if each node is broadcasting an indication of other nodes' timing and frequency data, an average time and frequency may be determined among the nodes over a period of time. The timing messages may also include an indication of the time the timing message was supposed to be broadcast, along with an indication of the frequency at which the message is being transmitted. Still further, the timing message may include an indication of time and/or frequency variance between it and the other surrounding nodes. The variance indication could state, for example, that node 101A is 1% slower than the average frequency used by the nodes currently part of the network of nodes.

The timing message can include many different information fields including any one or more of the following: node ID, message number, advertized time, identity of the node whose time is being broadcasted, hop count to a time source, GPS time, navigation data, time at which navigation data is valid, number of nodes that the transmitting node can hear, a data field that indicates a neighboring node identifier, a time difference between timing message reception and subsequent timing message transmission, and a signal-to-noise (SNR) measured at the timing message reception for each of a plurality of network nodes. While each of these information types has been mentioned specifically, it will be understood that the timing messages may include more or fewer information fields than those mentioned.

Accordingly, methods, systems and computer program products are provided which synchronize time among nodes in a network. The synchronized time may be synchronized to a very high degree of precision (e.g. sub-nanosecond differences between the nodes). This high level of precision allows distance measurements to be made between the nodes, geolocation measurements, and other communications or methods that require a highly synchronized time between nodes. Devices and apparatuses for performing such time synchronizations between nodes are also provided.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A method, implemented at a computer system that includes at least one processor, for synchronizing time among a plurality of nodes in a network, the method comprising:
   receiving, at a first node, at least one timing message from a second node in the network, the timing message providing an indication of the current time as measured by the second node at transmission of the timing message;
   determining the timing message propagation time between the first node and the second node using a determined transmission frequency of the timing messages, an internal clock reading of a clock that indicates the current time in the first node, and timing and frequency measurements obtained at both the first and the second node;
   applying a weighting factor to the current time of the first node to adjust the current time of the first node forward or backward; and
   combining the determined propagation time with the adjusted clock time of the first node to generate a new, synchronized time and transmission frequency, which is broadcasted in a subsequent timing message to one or more other nodes in the network.

2. The method of claim 1, wherein the network of nodes comprises a distributed network with a plurality of distributed nodes and no single master node that controls time.

3. The method of claim 1, wherein the weighting is tuned over time, such that the weighting is incrementally adjusted to increase accuracy of the current time of the first node.

4. The method of claim 1, wherein subsequent timing messages are broadcast continually with newly generated synchronized time and transmission frequency indications.

5. The method of claim 4, wherein the subsequent timing messages are broadcast without waiting for a reply message.

6. The method of claim 1, wherein the subsequent timing messages are broadcast as Geo-beacon messages.

7. The method of claim 1, further comprising:
   determining that at least one node in the network of nodes is providing unreliable time indications; and
   decreasing the weighting factor for the unreliable node.

8. The method of claim 1, wherein upon initially joining the network of nodes, an incoming node broadcasts a message indicating that the incoming node is not time synchronized.

9. The method of claim 8, wherein the incoming node receives a plurality of timing messages from other nodes in the network of nodes and combines those timing messages to interpolate a correct time.

10. The method of claim 9, further comprising the incoming node broadcasting a subsequent message declaring that the incoming node is now time synchronized.

11. A device for synchronizing time among a plurality of nodes in a network, wherein the device comprises the first node in the network, the device comprising:
   a transceiver configured to receive at least one timing message from a second node in the network and to transmit timing messages to other nodes in the network, the timing message providing an indication of the current time and frequency as measured by the first node at transmission of the timing message;
   a local oscillator that governs timing of an internal clock;
   a processor configured to determine a propagation time between the first node and the second node using a determined transmission frequency of the timing messages, a clock reading of the internal clock that indicates the current time in the first node, and timing and frequency measurements obtained at both the first and the second node;
   a weighting module configured to apply a weighting factor to the current time of the first node to adjust the current time of the first node forward or backward; and
   a time synchronization module configured to combine the determined propagation time with the adjusted clock time of the first node to generate a new, synchronized time and transmission frequency, which is broadcasted, using the transceiver, in a subsequent timing message to one or more other nodes in the network.

12. The time synchronizing device of claim 11, wherein propagation time between the first node and the second node is distinguished by identifying relative times between the first and second nodes using clock cycles.

13. The time synchronizing device of claim 12, wherein the propagation time is refined according to an indication of time relative to the period of the clock cycles.

14. The time synchronizing device of claim 11, wherein the subsequent timing messages are transmitted on a specified periodic basis.

15. The time synchronizing device of claim 11, wherein the timing message includes one or more of the following: node ID, message number, advertized time, identity of the node whose time is being broadcasted, hop count to a time source, GPS time, navigation data, time at which navigation data is valid, number of nodes that the transmitting node can hear, a data field that indicates a neighboring node identifier, a time difference between timing message reception and subsequent timing message transmission, and a signal-to-noise (SNR) measured at the timing message reception for each of a plurality of network nodes.

16. The time synchronizing device of claim 11, wherein the timing measurements remove clock differences and the frequency measurements remove frequency differences.

17. The time synchronizing device of claim 11, wherein the subsequent timing message includes timing and frequency data for each of the nodes that replied within a specified past period of time.

18. The time synchronizing device of claim 11, wherein the subsequent timing message includes an indication of how slow or fast the first node is relative to an average frequency among the nodes.

19. A method, implemented at a computer system that includes at least one processor, for synchronizing time among a plurality of nodes in a network, the method comprising:

receiving, at a first node, at least one timing message from a second node in the network, the timing message providing an indication of the current time as measured by the second node at transmission of the timing message, wherein a plurality of timing messages are sent at a regular interval with a specified period;

identifying a transmission frequency of the timing message;

identifying a current time at the first node, and a time at which the timing message was supposed to have been sent by the second node according to the specified period;

based on the current time, calculating the number of clock cycles that occurred between the time the timing message was sent and the time the timing message was supposed to have been sent, relative to the specified period, wherein the number of clock cycles relative to the period indicates a propagation time between the first and second nodes; and generating a new, synchronized time and transmission frequency, according to determined propagation time and the identified transmission frequency used by the second node, wherein the new, synchronized time and transmission frequency is broadcasted in a subsequent timing message to one or more other nodes in the network.

20. The method of claim 18, wherein the timing message propagation time is further based on timing and frequency measurements obtained at both the first and the second nodes.

21. The method of claim 18, wherein propagation time between the first node and the second node is distinguished by identifying relative times between the first and second nodes using clock cycles, the propagation time being refined according to an indication of time relative to the period of the clock cycles.

* * * * *